July 26, 1966     O. E. HALEY     3,262,320
DIFFERENTIAL FLOAT DEVICE

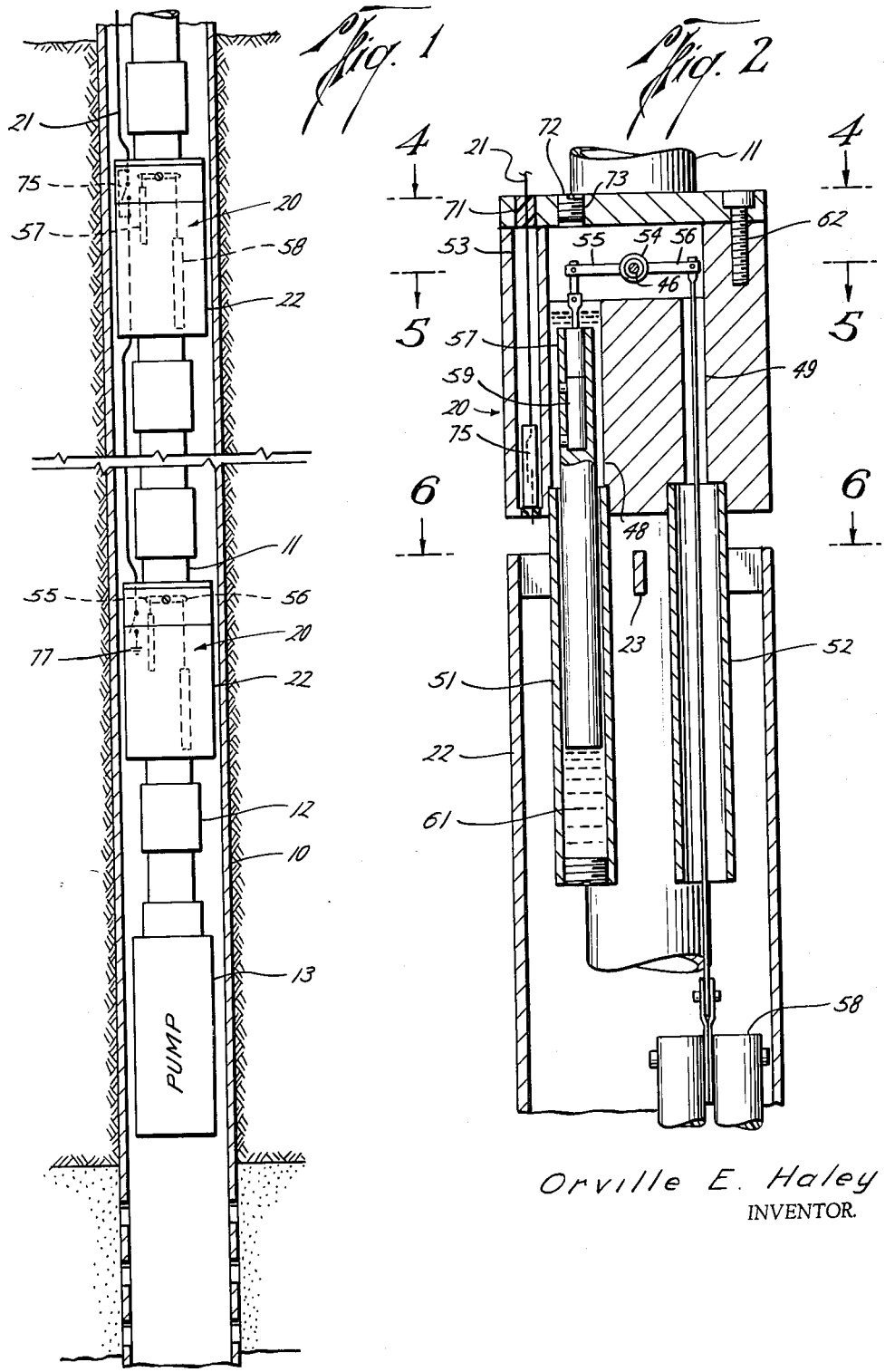

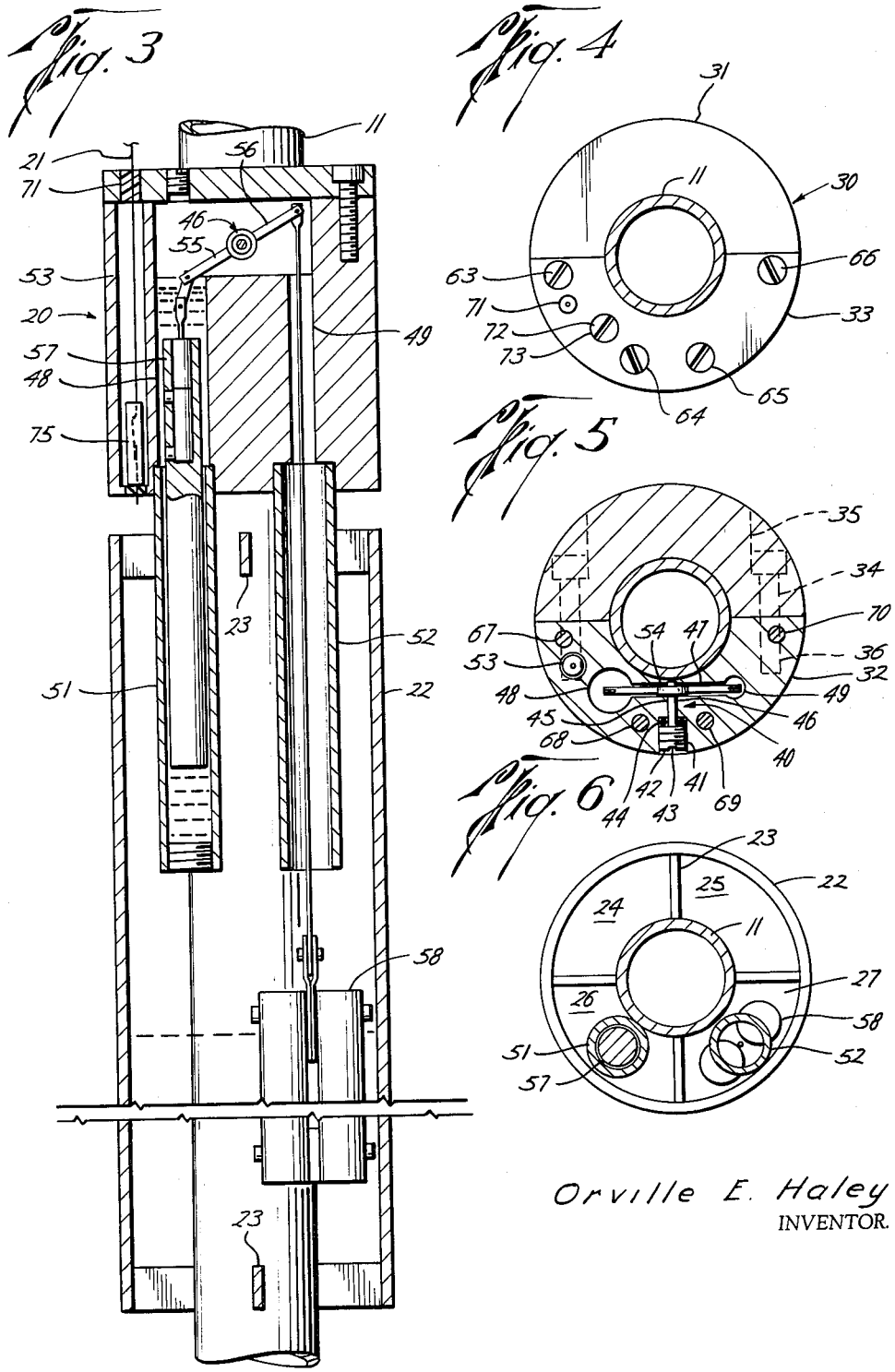

Original Filed Feb. 21, 1963     3 Sheets-Sheet 3

Orville E. Haley
INVENTOR.

3,262,320
DIFFERENTIAL FLOAT DEVICE
Orville Edgar Haley, Houston, Tex., assignor to Associated Engineering & Equipment Company, Inc., Houston, Tex., a corporation of Texas
Continuation of application Ser. No. 260,179, Feb. 21, 1963. This application June 17, 1965, Ser. No. 464,622
7 Claims. (Cl. 73—454)

This application is a continuation of my copending application Serial Number 260,179, filed February 21, 1963, now abandoned.

This invention concerns a differential float device designed to operate in fluids.

One object of the invention is to provide a novel means of ascertaining changes in the specific gravity of fluids contacted by said device. Said device may be balanced on having a portion thereof in contact with a fluid of one specific gravity, and not be balanced on contacting another fluid of a differing specific gravity.

Another object is to enable an operator to determine the presence of certain fluids in positions far removed from the observer's eye. Depending on the materials and quantities thereof used in forming the weights used in this invention, said weights may be made to balance or become imbalanced in substantially any fluid expected to be encountered.

A further object is to enable energy to be transmitted by and to mechanical and/or electrical attachments to this invention on fluids of differing specific gravity contacting portions of this invention.

Generally, this invention utilizes a pair of weights connected by means of a fulcrum or pivot arrangement. One of the weights is normally suspended in a partially closed reference medium, the other weight being free to contact and be acted upon by any fluid within the area under examination. The weights utilized may be of any desired size and material. By choosing the appropriate combination of weight and material, the two weights normally having differing combinations, the weights may thus be caused to be balanced, or imbalanced as desired, on the free weight contacting and being suspended or floating in a fluid having a specified or differing from a specified specific gravity. This may occur since one of the weights is normally suspended in a reference fluid. Thus, if the volume and density of said one weight is known, then the volume and density of the other weight may be so chosen as to cause the device to be balanced on said other weight contacting a particular fluid. Further, the weights may be so chosen as to be balanced or imbalanced in one direction on the free weight being suspended in any fluid having a specific gravity up to a certain level, then to become imbalanced in the other direction on said free weight being suspended in a fluid having a specific gravity at or at a higher than said certain level. Since said weight suspended in a reference fluid can move in a generally vertical direction, by placing a magnet within it, said weight is caused to operate an adjacent switch which in turn may cause operation of exteriorly located sources of motive power. In the embodiment discussed herein, on the closing of the switch, when said weight suspended in a reference fluid moves downwardly, a pump may be caused to operate whereby liquids present toward the bottom of a well may be evacuated from said well.

While a specific embodiment is described herein, it will be well understood that many changes and embodiments could be made by one skilled in the art and still remain within the scope of this invention, in which:

FIGURE 1 is a length of tubing inserted in a casing in section all being displaced underground and having the encased differential float device included therein.

FIGURE 2 is a vertical section through the differential float device and the housing therefor, depicting the weights on either side of the fulcrum being in balance;

FIGURE 3 is a view similar to FIGURE 2 except that the weights on either side of the fulcrum are unbalanced;

FIGURE 4 is a sectional view taken along lines 4—4 of FIGURE 2 depicting the top housing cover;

FIGURE 5 is a sectional view taken along lines 5—5 of FIGURE 2 depicting the fulcrum placement within the housing;

Figure 7:
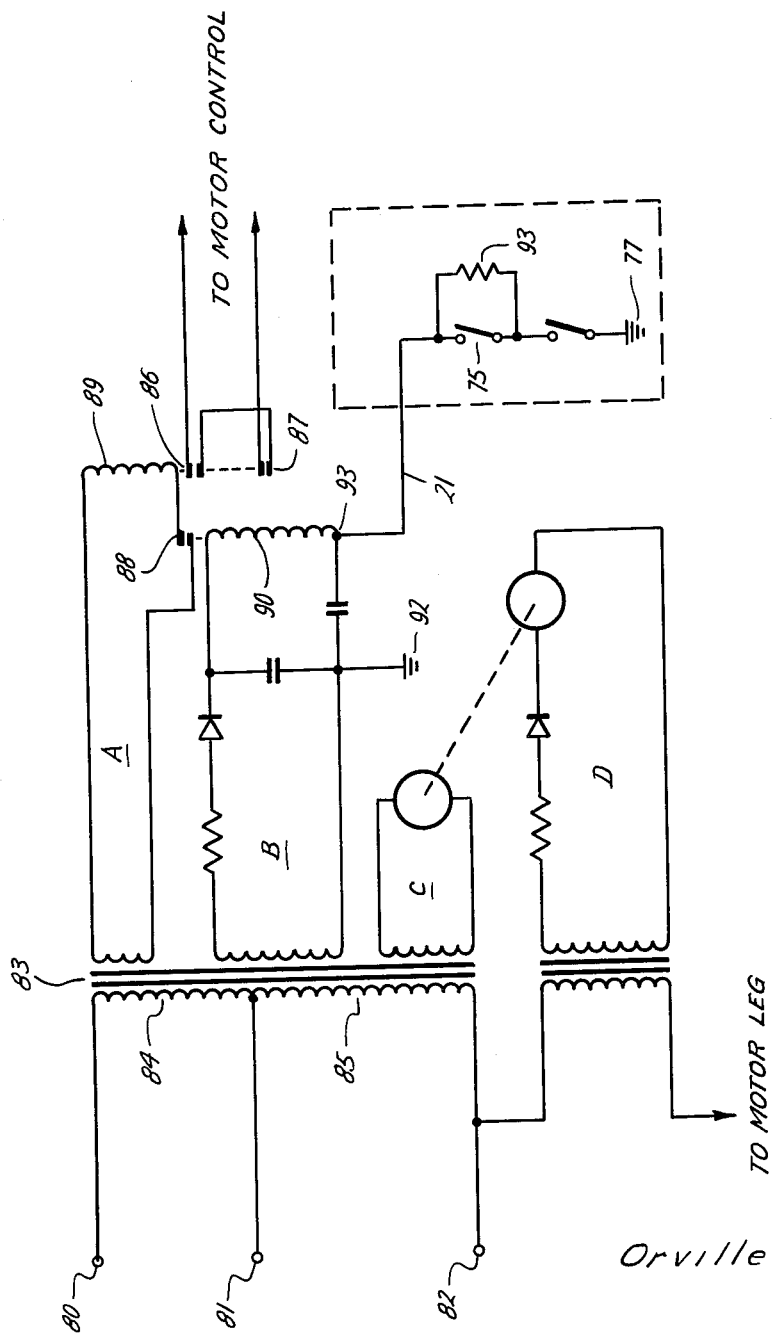

FIGURE 6, another sectional view, is taken along lines 6—6 of FIGURE 2 and illustrates the weights' placement within the housing;

FIGURE 7 is an electrical schematic diagram to, within, and from the differential float device illustrating one use therefor.

Referring now to FIGURE 1, a casing 10 is shown extending into the subsurface of the ground. At the very outset it should be noted that the present invention will be described in relation to an ordinary pumping type operation. However, the scope of applicability of this invention is much broader than that pertaining to this one use. Nevertheless, in order to show one capability, the device will be depicted as operating conjointly with the normal casings, tubings and fittings of an ordinary oil well pumping type operation. A plurality of tubing sections 11 are depicted as being inserted into casing 10. Joints 12 unite various tubing sections. FIGURE 1 further depicts a pump, illustrated at 13, as being attached to the lower end of the tubing sections.

The differential float device is illustrated generally at 20. Electrical leads 21 are shown connecting two such devices 20 and leading to operative connections exterior thereof. The device 20 includes a substantially hollow cylindrical housing 22 and is attached to tubing 11 by means of braces 23 (see FIGURE 6). In the embodiment herein depicted, a plurality of entrance passages 24, 25, 26, 27 are created at the upper entrance to housing 22. Similar passages are present at the lower entrance.

Slightly displaced above housing 22, a cylindrically shaped plate 30 is depicted in FIGURES 3 and 4 as comprised of rearwardlly portion 31, a lower forwardly portion 32 and an upper forwardly portion 33. Plate 30 will thus be seen to be composed of three portions, all of which are connected in a manner to be described hereinafter. Plate portion 31, possesses a semicircular cutout in its center allowing it to fit around the rear portion of tubing 11 and is displaced slightly upwardly of housing 22. Fitting members 34 are inserted into bore 35, the head of the members placed within counterbores, a plurality of which are spaced vertically on either side of member 31. Connecting bores exist in plate portion 32 allowing the fitting members 34 to be screwed or otherwise inserted through member 31 and into member 32 securely yet releasably linking the two.

Referring now to FIGURES 2, 3 and 5 a pivot 40 is shown to be inserted into circular opening or bore 41 appearing on the front of plate portion 32 near the top thereof. The head 42 is exteriorly threaded allowing mating with interior threads (not shown) in opening 41. Adjustment and removal of pivot 40 is permitted by means of recess 43 in head 42. A washer or gasket 44 is seated between head 42 and the base or rearwardly portion of opening 41. A reduced recess or bore 45 communicates with opening 41 at the rear thereof. The reduced portion or pin 46 of pivot 40 is removably and rotatably seated within this reduced opening 45. In the upper face of lower plate portion 32 there is a transverse recess 47 connected at either end with vertical recesses or bores 48 and 49 each of which extend from the upper surface to the lower surface or all the way through member 32. Press fitted into the lower end of member 32 and communicating with bores 48 and 49 are the upper portions of hollow cylindrical tubes 51 and 52. Obviously member 32 could be interiorly threaded and tubes 51 and 52 exteriorly threaded so that the tubes could be threadedly engaged with member 32 and thereby communicate with bores 48 and 49. Each of the two tubes extend through a different one of housing entrances 24, 25, 26 or 27 into the interior of housing 22. Tube 51 has a threaded plug screwed into the threaded lower end of said tube, while tube 52 is open at its lower end. In some applications, both tubes may be open. Usually, however, tube 51 is closed and contains a reference fluid utilized in a manner hereinafter described.

Slightly outwardly and rearwardly of bore 48 is a further opening or bore 53 extending through the entire depth of member 32. An electrical connection passes through this opening in a manner and for a purpose later described.

Returning now to pivot 40 and especially FIGURES 2, 3 and 5, circular bearing member 54 surrounds pin 46 and is pivotally supported by said pivot pin. Connected by welding, soldering or any other appropriate method to oppositely directed portions of bearing 54 are rocker arms 55 and 56. Toward the end of each of said arms 55 and 56, away from said bearing 54, are pivotal linkages which may take any appropriate form of connection such as a pin-in-slot. Each of said linkages is connected, at its lower end, to one of weights 57 and 58. FIGURE 1 shows weight 58 to be substantially longer than weight 57. A magnet 59 is embedded in the upper portion of weight 57. The interior of tube 51 may be partially filled with oil or other heavy, relatively incompressible lubricating fluid as indicated at 61 for reasons hereinafter discussed.

Top cover plate 33 is placed over member 32 and attached thereto by means of screws or bolts such as 62 (see FIG. 2) inserted in counterbores 63, 64, 65 and 66 of plate 33 and engaging threaded sockets 67, 68, 69 and 70 of member 32. Bore 71 of plate 33 permits the passage of electrical lead 21 through plate 33. Threadedly adjustable plug 72 mates with internally threaded opening 73, said opening communicating with bore 48 in member 32.

FIGURE 1 depicts electrical lead 21, having some external connection above the terrain, entering within the cavity enclosed by casing 10, continuing downwardly to pass through bore 71 of plate 33, and continuing downwardly through opening 53 in member 32. Closely adjacent to magnet-containing weight 57, lead 21 includes a magnetically controlled switch 75, the construction of said switch being commonly known and not further described herein. In the embodiment shown in FIGURE 1, lead 21 then continues downwardly through the length of bore 53 and enters a further device similar to 20 hereinbefore described. Below a switch similar to switch 75, the lead 21 is grounded as at 77.

Now comes an explanation of the operation of this invention. One of the gifts of the antiquity is the bits of knowledge called Archimedes' principle and stated as, "Any object floating or submerged in a fluid is buoyed up by a force equal to the weight of the displaced fluid." Put another way, the principle states that, "the loss of weight of an object in a fluid is equal to the weight of the fluid it displaces."

In this particular invention, two separate and distinct weights 57 and 58 are inserted into a housing. They are connected to the ends of rocker arms 55 and 56. The arms, in turn, are pivotally supported by pivot pin 46. The two weights 57 and 58 are constructed of diverse materials having different masses, weights in air and/or specific gravities. For example, weight 57 may be constructed of a relatively heavy, yet compact, metal. Weight 58 may be constructed of a material, such as nylon, having a different specific gravity from that of the material used for weight 57. Suspended in air, for example, these two members may differ in weight by some amount, say fifty grams. The same two weights, on being suspended in some other fluid or in a liquid may have their weight differentials in the fluid vary according to the particular fluid or liquid utilized for immersion. For another example, if, as in the present embodiment weight 57 is of a compact, high density material and 58 is relatively large yet of low density or light material, the weight 58 may be heavier by fifty grams than 57 when the two are suspended in air. On their being suspended in a fluid such as gasoline (specific gravity lying between that of air and that of water), the two weights may be balanced. On being immersed in water, the weight 57, displacing less liquid may "outweigh" weight 58. By selecting the material and quantity thereof said weights may be made to balance under an initial set of circumstances. For example, the reference fluid 61 may be chosen, along with the materials composing weights 57 and 58, so that if weight 58 is suspended in air, the two weights will be balanced. Or, if desired, the ingredients may be so modified that weight 58 will be the "heavier" until weight 58 is acted upon by a fluid having a specific gravity higher than a specific level. Thus, under this latter set of circumstances the switch would not close until such a higher-specific-gravity fluid were encountered by weight 58. Naturally, the reverse situation could be provided for, i.e., imbalance in favor of weight 57 would shift to one in favor of weight 58 on weight 58 encountering a fluid having its specific gravity at or beyond a discreet level.

Obviously the type of material used for the two weights may be varied according to the particular usage desired. The particular principle of the invention herein described will allow detection of various fluids or liquids sought, as well as the detection of changes in the composition of fluids or liquids contacted. Particular usages may vary from detecting the presence of hydrocarbon containing liquids below ground to determine water levels to detecting a changed makeup in the fuel mixture of internal combustion engines. Wherever the detection of or the detection of changes in fluid or liquid substances is of importance this device would find usage.

Further concerning usage in this embodiment, weight 57 is inserted into tube 51. This tube may be partially filled with lubricating oil or some relatively non-compressible substance entering through opening 73, and having a prime function of preventing high pressures causing fluids encountered to enter the bottom of tube 52, proceeding upwardly and contaminating and engulfing pivot 40. Further, however, weight 57 may not normally encounter the fluid encountered by weight 58. Thus whether the reference fluid be lubricating oil or merely trapped air, the important feature is that a reference fluid is provided whereby the only variable is the fluid to be encountered by weight 58.

When weight 58 encounters a fluid creeping upwardly within casing 10 and housing 22, the tendency will be for weight 57 to move downwardly. As magnet 59 moves within the range of magnetically operated switch 75, the switch will close (see FIGURE 3). Likewise, when the fluid encountered by weight 58 is such that its weight in the fluid is greater than the weight of 57 disposed in its bath, then weight 57 will move upwardly, move magnet 59 out of the area of attraction of switch 75 and tend to open said switch.

Looking now at FIGURE 7 a particular electrical circuit that may be utilized in this embodiment is shown. Present are input leads 80, 81 and 82. These would permit utilization of electrical input having varying voltage, as for example 440 or 220. Thus current may be induced in circuit A, which in turn by virtue of relay coil 89 may close switches 86 and 87 allowing the motor, through leads not shown, to operate the pump 13. Pump 13 would then cause liquids such as crude oil to be evacuated in an ordinary manner from the lower reaches of the well to tanks above the ground surface. The presence of switch 88, however, is noted. In order for current to flow in circuit A, thereby causing operation of the motor, current must also flow in circuit B, thus causing current through relay coil 90 to close switch 88. Original current in circuit B is induced by transformer 83. The presence of rectifying circuitry in circuit B is noted, but the specific details thereof are not important to this invention. Circuit B is grounded at 92. A lead from one end 93 of coil 90 goes to the upper portion of device 20 (see FIGURE 1 and the area enclosed by dashed lines in FIGURE 7). Within the electrical lead, designated 21 in FIGURES 1 and 7, there is present the above described magnetically operated switch 75. In parallel thereto there is a resistance 93. This resistance is not shown in FIGURES 1–6. It is present only in the upper of devices 20 appearing in FIGURE 1. Its purpose is to allow some current to bypass switch 75 to circuit B even though the fluid level drops below the level of said switch causing same to open because of weight 57 moving upwardly. Lead 21 continues from the lower portion of switch 75 to a similar switch (not numbered) present in the lower of the devices 20 as depicted in FIGURE 1, and from there is grounded. Circuits C and D may be utilized to operate a timing mechanism in a manner not important to this invention. Thus in this particular embodiment, when a liquid or fluid of the contemplated specific gravity rises above the level of the upper of devices 20, both of the switches 75 will be closed causing the motor to operate pump 13, removing fluid from the casing, assuming of course power being supplied to input leads 80, 81, 82. On the fluid level dropping below the uppermost of devices 20, sufficient current will flow through by-pass resistance 93, and thereby through coil 90 keeping switch 88 closed and thus continuing operation of the pump. The pumping operation will continue until the level of the liquid drops below the lowermost of devices 20 when the switches 75 will both be open thereby cutting off the motor driven pump. The cycle will be repeated with the pump and motor being operated when the fluid builds up to a level above the upper of devices 20. When the level rises to a position between devices 20, insufficient current passes through resistance 93 to start the pump, normally more current being required to start the device than to operate same. Briefly stated, the operation of this invention is as follows. Weights 57, 58, having diverse specific gravities are pivotally suspended by pivot 46. On magnet 59, imbedded in weight 57, passing adjacent magnetically operated switch 75, said switch is closed allowing current to pass through lead 21. Said switch 75 may be connected to other similar switches such as shown in FIGURE 1, eventually lead 21 being grounded, as at 77. Said lead 21 is connected at its upper end, above ground in this embodiment, to one end of coil 40. Thus, since weight 57 is suspended in a reference fluid, when weight 58 encounters a fluid different from that at which the weights are initially balanced, weight 57 will cause switch 75 to close, to later reopen on fluid acting on weight 58 being removed or pumped.

Assume that a plurality of connected devices 20 are inserted within casing 10. As fluids within the well rise, they will initially pass the lower of devices 20 as shown in FIGURE 1. At this time, insufficient current will pass through bypass resistance 93, see FIGURE 7, to activate the motor control and thereby pump 13. On the fluids continuing to rise upwardly so that switch 75 in the upper of devices 20 is closed, then sufficient current will pass through lead 21 so that switch 88 is closed, thereby causing the motor to operate pump 13 and evacuate the fluids. Of course neither the specific electrical power source provided to input leads 80, 81, 82 nor the particular connections from the motor to pump 13 are shown since such are old in the art, and individually considered do not form a part of this invention.

Since weights 57, 58 may be initially balanced with weight 58 suspended in any chosen reference fluid, for example air or water, when weight 58 encounters a fluid of different specific gravity, the device will tend to become operational. Thus, since the material comprising weights 57, 58 may be chosen from any desired, the weights may become balanced or unbalanced on weight 58 encountering a specific fluid whose specific gravity is known or on encountering a fluid different from that used as the reference fluid for weight 58. Thus, on the motor control beginning to operate, an operator or viewer will know the occurrence of such an event, without actually being at the scene of such an encounter. Further, an above ground operator on viewing the timer operation depicted diagrammatically only as circuits c, d of FIGURE 7 may become aware of such an encounter. Note here, the electrical connection between the motor leg and the coil inducing current in circuit D.

Keeping in mind the many variations or modifications that might be made by one skilled in the art, what is desired to be protected by Letters Patent is encompassed by the following appended claims:

What is claimed is:
1. In a fluid testing device, the combination of:
a plurality of pivotally supported weights,
means for supporting said weights in a housing,
means allowing at least one of said weights to directly come into contact with fluid present in the area surrounding said device, combination means for preventing another of said weights from contacting said fluid present and for containing a reference fluid intended to at least partially encompass said another of said weights,
energy transmitting means adjacent one of said weights,
means for activating said energy transmitting means, and
means causing said activating means to activate said energy transmitting means on one of said weights coming into contact with said fluid present.
2. The device of claim 1, wherein:
said energy transmitting means includes a magnetically operable switch means, and
said activating means includes a magnet present in one of said weights.
3. In a device allowing the presence of fluids to cause the operation of energy producing equipment, the combination of:
a pair of pivotally supported weights,
weight-supporting pivot means for supporting said weights,
each of said weights being constructed of material having a different specific gravity from that of the other material,
energy transmitting means including an activatable switch disposed adjacent one of said weights,
means for activating said switch included in one of said weights, and
means for protecting said pivot means from contamination by said fluids, and means for containing a reference material provided to said one of said weights, said one of said weights being at least partially encompassed by said reference material, said containing means further tending to prevent said one of said weights from contacting said fluids.
4. The device of claim 3, including
a housing for said weights,
said activatable switch being magnetically activatable, and
said activating means includes a magnet.
5. In a fluid testing device, the combination of:
a plurality of units each of which includes
a pair of pivotally supported weights,
weight-supporting pivot means for supporting said weights,
each of said weights being constructed of material having a different specific gravity from that of the other material, one of said weights being permitted to contact a reference fluid and the other of said weights permitted to freely con- tact the natural fluids adjacent said device but not said reference fluid,
energy transmitting means, including
a magnetically activatable switch, disposed adjacent said one of said weights,
means for activating said switch included in said one of said weights, and
means for protecting said pivot means from contamination by said fluid;
electrical connecting means connecting each of said units; and
electrical connecting means connecting one of said units to an externally located means of transforming electrical energy to mechanical energy; and electrical bypass means in said one of said units permitting electrical current to bypass said switch in said one unit when said weights in said one unit are in a balanced position and said weights in at least one of the other said units is not in a balanced position.

6. In a fluid float device, the combination of:
a plurality of weights, each being constructed of a material having a different specific gravity from that of the other,
a pivot arrangement having said weights attached to spaced positions thereof,
a reference-fluid-containing tube having one of said weights inserted at least partially therein, and
the other of said weights being substantially freely suspended from one of said portions of said pivot arrangement, and magnetic means included in said one of said weights for closing a switch on said another of said weights alone contacting fluids adjacent said another of said weights.

7. In a device for determining changes in fluid composition and for ascertaining the presence of fluids, the combination of:
a housing, said housing comprising a hollow cylindrical plate and adapted to be attached to and round a section of tubing,
a sectionalized second plate comprising a plurality of hemi-cylindrical sub-plates adapted to mate with each other and surround a portion of said tubing, said second plate being positioned slightly upwardly of said housing,
a pivot member adjustably and removably inserted into a portion of said second plate,
bushing means encompassing a portion of said pivot member,
a pair of oppositely disposed rocker arms connected to said pivot member,
weights connected to each of said rocker arms, each of said weights being constructed of a material having a different specific gravity from that of the material used in the other of said weights,
a first substantially vertical opening in said second plate adapted to permit entry of one of said weights,
a second substantially vertical opening in said second plate adapted to permit entry of the other of said weights,
a first tube removably positioned in said first opening and communicating therewith, said first tube being closed at one end and containing a reference fluid therein,
a second tube removably positioned in said second opening and communicating therewith,
a portion of said first and second tubes being inserted within a portion of said housing, said one of said weights normally being in contact with said reference fluid and said other of said weights being free to contact fluids present in the area surrounding said device,
a closure member for one end of said first tube,
a magnetically operable switch means disposed adjacent one of said weights,
said weight adjacent said switch means including a magnet for operating said switch means on said weight adjacent said switch means being in an unbalanced position, and
means for electrically connecting said switch means to external energy-conversion devices, electrical energy being caused to flow through said electrically connecting means on said weight being in an unbalanced position.

References Cited by the Examiner
UNITED STATES PATENTS
2,671,834   3/1954   Kmiecik.
3,117,454   1/1964   Pierce _____ 73—437

FOREIGN PATENTS
1,098,587   3/1955   France.

LOUIS R. PRINCE, *Primary Examiner.*

DAVID SCHONBERG, *Examiner.*

M. B. HEPPS, *Assistant Examiner.*